Oct. 29, 1968     P. L. KOSOGORIN     3,407,609

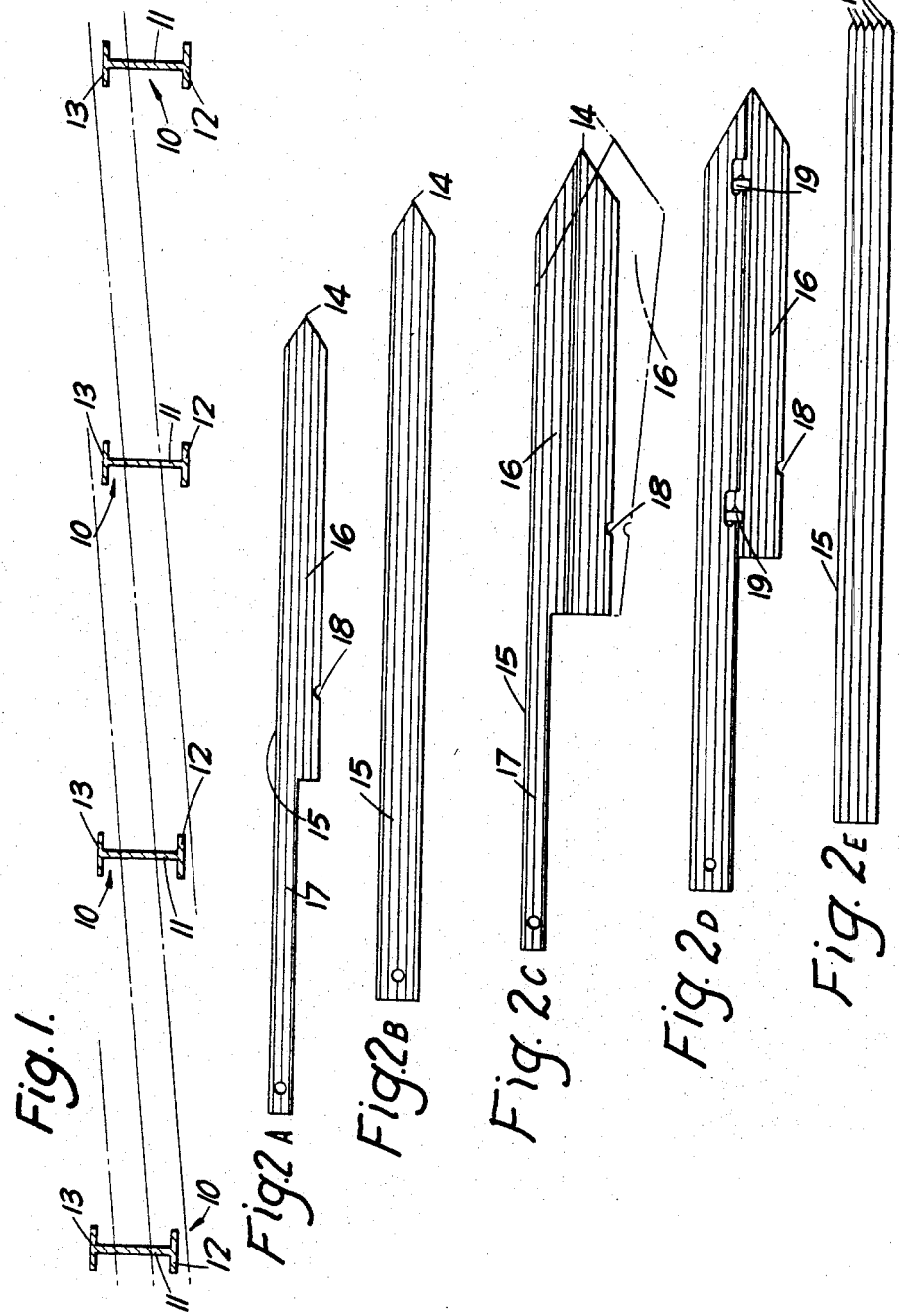

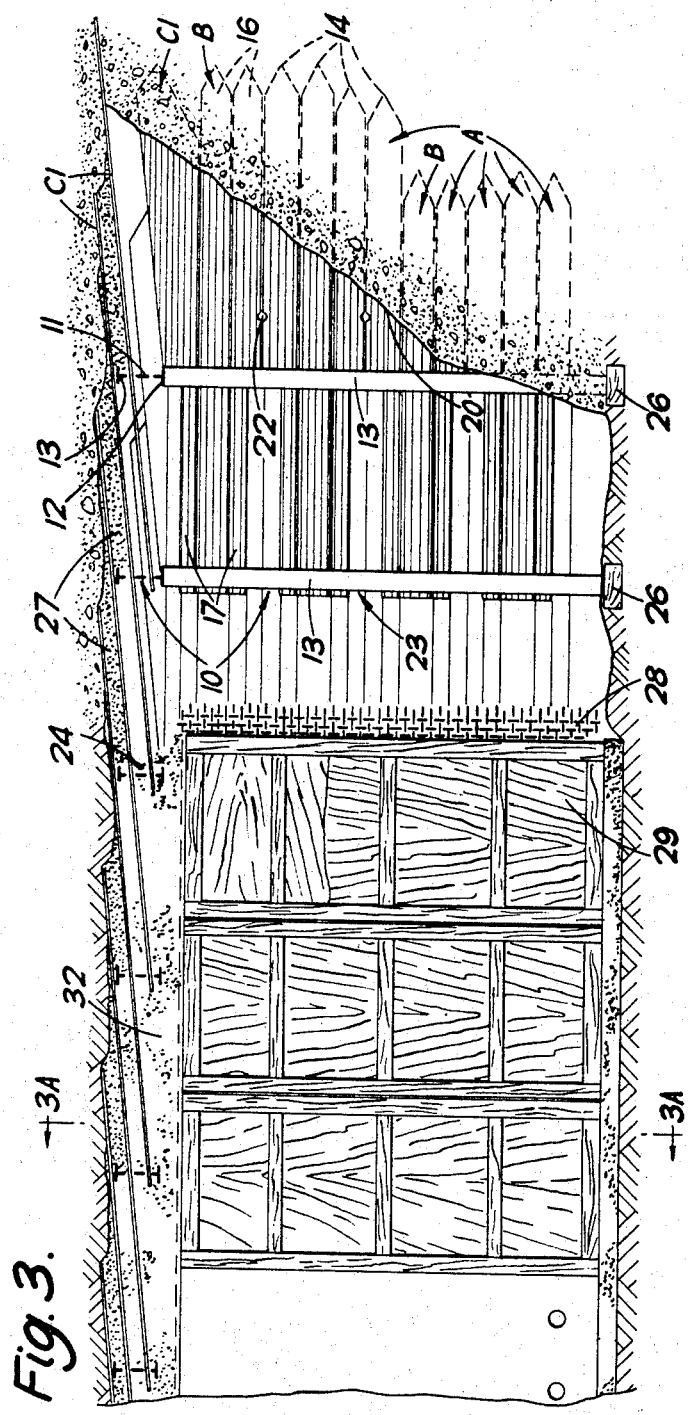

TUNNELLING METHOD AND APPARATUS

Filed April 24, 1967     4 Sheets-Sheet 4

United States Patent Office 3,407,609
Patented Oct. 29, 1968

3,407,609
TUNNELLING METHOD AND APPARATUS
Patricia Lorna Kosogorin, Dunluce, Swanlow Lane,
Winsford, Cheshire, England
Filed Apr. 24, 1967, Ser. No. 633,193
Claims priority, application Great Britain, Apr. 26, 1966,
18,276/66
8 Claims. (Cl. 61—42)

ABSTRACT OF THE DISCLOSURE

A method of driving a tunnel comprises repeatedly positioning successive frames against the face of the ground to be excavated, driving piles through slots in adjacent frames into the ground ahead of the frames and excavating a part of the volume of ground contained by the piles, a proportion at least of the piles having heads which are wider than their shanks.

Summary

A method of driving a tunnel using defining frames and involving driving elongated members through holes therein, and thereafter excavating the ground along at least part of the length of the driven elongated members, employs at least two elongated members driven through each hole, the heads of a proportion of the elongated members projecting through the defining frames being wider than the shanks such that total width of the heads defining the tunnel is greater than the total width of the holes in each frame.

This invention relates to a method of, and apparatus for, driving a tunnel, and is an improvement in, or modification of, the invention described and claimed in our British Patent No. 945,532. The term "tunnel" is used in its broadest sense, and includes such underground excavations as passages, shafts and trenches.

In the said British patent there is claimed "a method of driving a tunnel which method comprises placing a frame at or adjacent to the face of the ground through which the tununel is to be driven, which frame defines the approximate cross sectional area of the tunnel (or a part thereof) and is provided with a series of holes, driving elongated members through the holes into the ground ahead of the frame to define the walls of the tunnel, excavating the ground along at least part of the length of the elongated members to form part of the tunnel, placing a second frame provided with a series of holes in the tunnel spaced ahead of the first frame, driving elongated members through the holes into the ground ahead of the second frame to define the walls of a further part of the tunnel, and excavating the ground along at least part of the length of the further elongated members the positioning of the frames, the holes therein, and the elongated members being such that the elongated members and frames support the ground around the walls of the "tunnel." This method is hereinafter referred to as "the hereinbefore defined method."

The present invention provides a method of driving a tunnel, which method is an improvement in, or modification of, the hereinbefore defined method, wherein some of the elongated members employed have heads which are wider than their shanks, so that, when in position, they support more of the ground around the walls of the tunnel than would members whose heads were the same width as their shanks. The head of an elongated member is defined as that part which, when the elongated member is in position projects forward of the foremost frame through which it passes. The shank of an elongated member is defined as that part which lies in a hole in one or more of the frames when the elongated member is in position. Conveniently, the entire elongated member behind the head is of the same, narrower, width, but it is only strictly necessary for the member to be narrow at the point or points where, when in position, it lies within a hole in one of the frames.

It is a preferred feature of the hereinbefore defined method, and of the method of the present invention that each frame is provided with two parallel rows of holes, one row being spaced inwardly of the other, and the elongated members are passed through holes in the inner row of a first frame, and through holes in the outer row of the next frame, being the frame at or adjacent to the face of the ground through which the tunnel is to be driven, before being driven into the ground to define the walls of a further length of tunnel.

According to the present invention it is preferred to pass a plurality of elongated members or slats, e.g. three, through each hole in a frame. Two of the slats for each hole are substantially flat and have heads which extend on one side only of the length of the shank. These two slats are driven through a hole (the dimension of the hole, the heads and the shanks being such as to enable this to be done) into the ground ahead of the frame so that the major faces of each are substantially parallel to the intended wall of the tunnel at that point, and so that the extended side of the head of each points away from the other. A third slat, having the same width throughout its length, is then driven through the hole between the two slats already there, so as to force the heads of the two slats apart and sideways into the ground.

The elongated members, or slats, are convenientty made of corrugated metal, and are considered as "flat" for the purposes of the preceding paragraph by ignoring the corrugations. As will be apparent the use of corrugated slats enables the slats to be fitted together at their edges if desired. The elongated members may also be constructed from rods or tubes e.g. of ⅞" diameter.

As will be appreciated, it will normally be necessary for the holes to be elongated into slots parallel to the adjacent wall of the tunnel. In order to maintain the strength of the frames, whose main purpose is to support the walls of the tunnel through the action of the slats, it is desirable to minimise these elongations. The invention enables a greater proportion of the tunnel wall to be supported by the slats than was previously possible, using slats having the same width throughout their length, without materially weakening the frames. It is preferred that the slats support substantially the entire tunnel wall. This can be achieved by a suitable choice of the dimensions of the slots and the slats, as will now be described with reference to the accompanying drawings, in which:

FIGURE 1 is a diagram to show the angles and spacing of the holes in the frames;

FIGURES 2A through 2E show five different types of slats;

FIGURE 3 is a side elevation, partly cut away, of a tunnel which is being driven according to the method of the invention;

Like reference numerals represent like parts throughout.

Figure 3A:
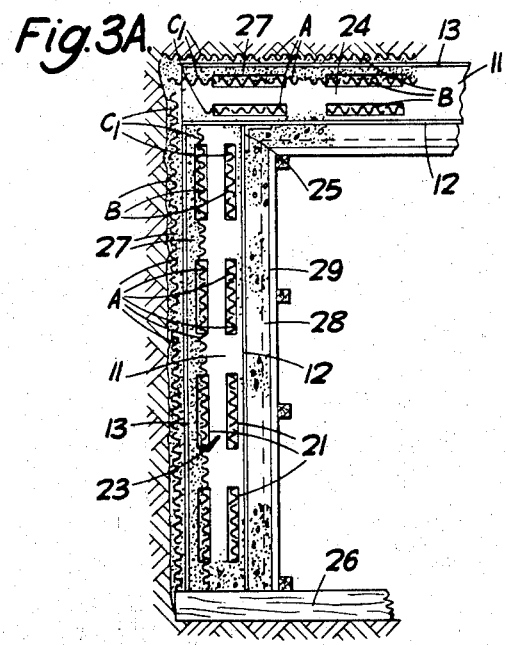
FIGURE 3a is a cross-section on the line 3a of FIGURE 3.

Referring to FIGURE 1, four frames 10 are shown in cross-section in a tunnel which is being driven from left to right. The cross-section of the frames 10 is H-shaped, consisting of a plate 11 prependicular to the direction of the tunnel and an inner flange 12 and an outer flange 13 both parallel to the adjacent wall of the tunnel. The frames 10 are spaced 3 feet apart in the tunnel. Slots are cut at 5″ pitch in the plates 11 of the frames 10 on the line of intersection produced by 1″ clearance from the inside face of the flange 12 of one frame to 1″ clear of the outside face of the flange 13 of the third frame along. 1″ clearances are suitable in loose ground, but may be reduced to ½″ in clay. Each slot is 10″ long.

FIGURE 2 is a composite figure illustrating various types of slat which may be employed. A to D are all of corrugated iron, while E consists of five ⅞″ diameter bars. All the slats are pointed at 14 at their forward end, to facilitate being driven into the ground. All the slats are substantially flat (ignoring the corrugations) and have one straight side 15.

Slat A is a side-locking slat, whose head 16 is 5″ wide, and whose shank 17 is 2½″ wide and 3′3″ long (or three inches greater than twice the spacing of the frames 10). A small nick 18 of semi-circular cross-section, is taken out of the side of the head 16 on which it extends from the shank 17, 1′6″ forward of the rear end of the head.

Slat B is a plain or wedge slat, 5″ wide throughout its length.

Slat C is a deep side-locking slat, similar to slat A, but having a head 16 which is 10″ wide. The point 14 is 6″ from the straight side 15. Also shown dotted in this drawing is a corner locking slat C1. The head 16 becomes broader towards the point, and may be made as broad as is required to pass the last frame at the face, taking into account the settlement of the frame.

Slat D has a head 16 which is 10″ wide, the two longitudinal halves of the head being hinged together at 19. The shank is 5″ wide.

Slat E consists of five ⅞″ diameter bars which may be separated after being driven into the ground, thereby giving an external shield for holding the ground, and an internal shield for reinforcement.

Figure 4:
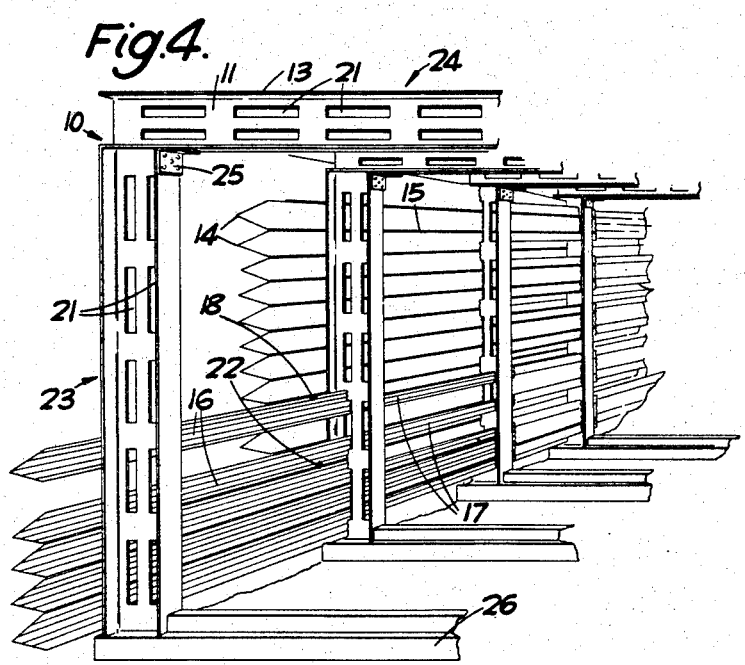
FIGURE 4 is a perspective view of the straight-sided tunnel illustrated in FIGURES 3 and 3a ,and FIGURE 5 is a perspective view of an arched tunnel.

FIGURES 3, 3a and 4 show a straight-sided tunnel, being driven from left to right in FIGURE 3, and towards the viewer in FIGURES 3a and 4. Driven into the face of the ground 20, through each slot 21 in plate 11 of the frames 10, are three slats. In most of the slots 21 there consist of two side-locking slats A, with a wedge slat B between. The dimensions are such that the extended heads 16 of the side-locking slats A of adjacent holes just meet, and the two semi-circular nicks 18 cooperate to form a grouting hole 22.

The slots 21 which are adjacent either the top of the vertical sections 23 of the frame 10 or either end of the horizontal roof section 24 hold one slat A, one slat B and one slat C1, the slat C1 extending far enough to cover the end of that section 23 or 24 of the frame 10.

The vertical horizontal sections 23 and 24 of the frame 10 are bolted together by means of a right-angled plate 25. The lower ends of the vertical section 23 are fixed to timber stretchers 26 which extend across the floor of the tunnel.

The gaps between the heads 16 of adjacent sets of slats are filled in with grout comprising fly-ash and mortar but no coarse aggregate at 27. A reinforcing wire mesh 28 is fixed inside the frames 10, and shuttering 29 is erected inside the wire mesh. The space between the shuttering 29 and the slats is filled in with constructional concrete consisting of ⅜″ to ½″ aggregate at 32 to complete the tunnel.

Figure 5:
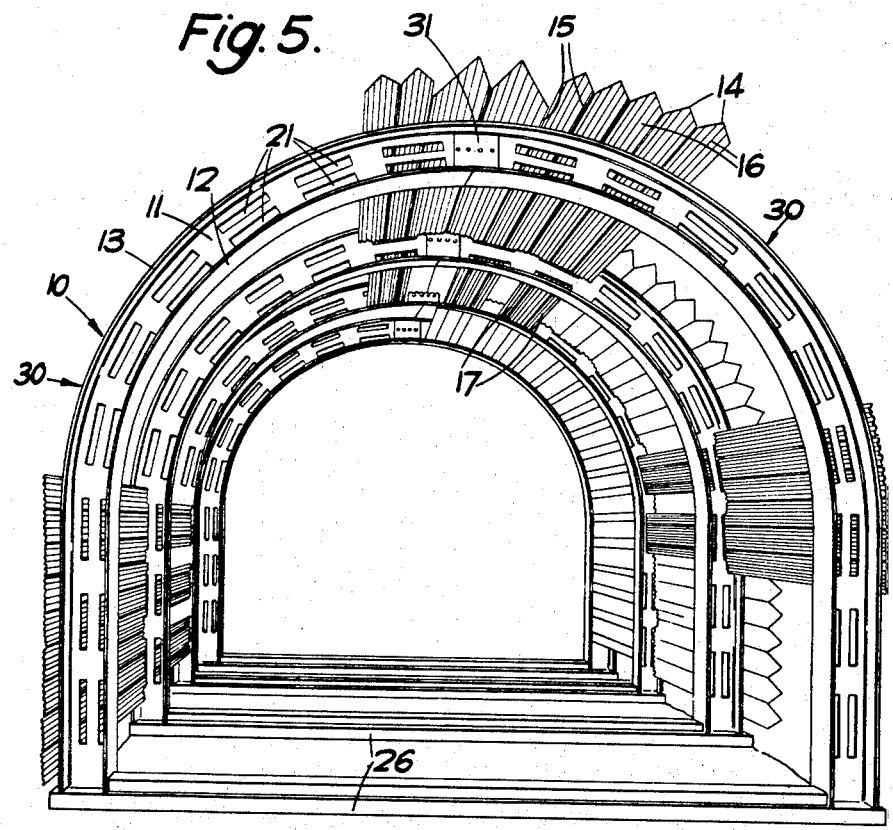

FIGURE 5 is a view, similar to that of FIGURE 4, of an arched tunnel. The differences in construction between the straight-sided tunnel shown in FIGURES 3, 3a and 4, and the arched tunnel shown in FIGURE 5 are as follows:

(a) The frames 10 for the arched tunnel are of two equal sections 30, bolted together on the plate 11 by means of a fishplate 31, and (b) As there are no corners, every slot 21 holds two side-locking slats A and a straight or wedge slat B between them.

The invention is not limited to the specific examples illustrated in FIGURES 3 to 5 of the drawings. For instance, slats C, D or E could be used in place of some of the slats illustrated. Also, it is not necessary for the slats to pass through slots in two frames.

The present invention also provides apparatus for use in tunnelling comprising two frames each of a shape and size to define the walls of the tunnel (or a part thereof) and each having two rows of holes the rows conforming in shape to the walls (or part) and one row being within the other in combination with a plurality of slats or prongs which, when the frames are aligned one behind the other and spaced apart, can be driven each through a hole of the inner row of one frame and the outer row of the other frame to project beyond the said other frame, the projecting portions of the slats diverging outwardly, wherein the slats have heads which are wider than their shanks, so that, when in position, they support more of the ground around the walls of the tunnel than would slats whose heads were the same widths as their shanks.

It will be appreciated that the elongated members or slats used in the method of the present invention serve to define the outline of the tunnel which is being constructed and the extremities of the heads of the slats are supported by the earth into which the slats have been driven and which they enclose. Thus, in view of the ability of slats to fit closely together, according to the practice of the present invention, the slats can minimise the occurrence of falls during excavation and provide effective protection for miners who are carrying out the excavation, whilst working within the shield provided by the slats.

It will further be appreciated that the actual driving of the elongated members can be considered to constitute the most important step of the excavation since the slats themselves cut out the tunnel and it only remains for the earth contained within the shell formed by the driven slats to be removed.

Furthermore it will be noted that the nature of the method is such that the slats always precede the actual excavation, the method of the present invention being such that the cutting of the tunnel and the removal of earth are in effect separated into two distinct and convenient steps instead of being performed in a single complex operation; the cutting of the tunnel always proceeds in advance of the earth removal and the means used for cutting the tunnel (i.e. the slats) thereafter protect and assist the earth removal operation.

The invention is of particular utility for driving tunnels through unstable or boggy ground where the entire roof and walls have to be supported.

I claim:

1. A method of driving a tunnel which method comprises positioning two frames in the tunnel, a first frame spaced from the face of the ground through which the tunnel is to be driven, a second frame at or adjacent the said face, each frame defining the approximate cross-sectional area of the tunnel (or part thereof) and being provided with a first and a second row of holes, the holes in both rows extending through the frame in the direction of the tunnel, and the first row being spaced inwardly of the second row, driving elongated members through the first row of holes in the first frame, through the second set of holes in the second frame and into the ground ahead of the second frame to define the walls of the tunnel, excavating the ground along at least a part of the length of the elongated members to form part of the tunnel, placing a third frame at or adjacent the thus-formed face of the ground through which the tunnel is to be driven, said third frame being spaced from said second frame and having, as have the first and second frames, first and second rows of holes extending through the frame in the direction of the tunnel, the first row being spaced inwardly of the second row, driving further elongated members through the first row of holes in the second frame, through the second row of holes in the third frame and into the ground ahead of the third frame to define the walls of the tunnel, and excavating the ground along at least part of the length of the further elongated members, wherein the improvement comprises, employing an elongated member to be driven first through each hole of said first, second and third frames which has a shank which is narrower than the head of said first-driven elongated member, said first-driven elongated members being driven through said holes to a degree such that the heads of said elongated members project wholly beyond the second hole through which each member is driven, and thereafter driving at least one further elongated member through each hole of said frames whereby the heads of the elongated members which have been driven through the holes have a total width in the plane of the periphery of the tunnel which is greater than the width of the holes through which the said members were driven.

2. A method as claimed in claim 1 wherein at least three elongated members are driven through each hole of said frames, each of the outer elongated members driven through each hole having a shank which is narrower than the head of said outer elongated members.

3. A method as claimed in claim 2 wherein three elongated members are driven through each hole of said frames, said outer elongated members being driven through said hole before the third elongated member and the said third elongated member being then driven between the two outer elongated members so as to force the heads of the two outer members apart and sideways into the ground.

4. A method as claimed in claim 1 wherein the said first-driven elongated members are substantially flat and have heads which extend on one side only of the length of the shank.

5. A method as claimed in claim 1 wherein three elongated members in the form of slats are driven through each hole in a frame, two of said slats for each hole being substantially flat and having heads which extend on one side only of the length of the shank, said two slats being driven through a hole in the frame into the ground ahead of the frame so that the major faces of each are substantially parallel to the intended wall of the tunnel at that point, and so that the extended side of the head of each slat points away from the other, a third slat having the same width throughout its length being then driven through the hole between the said two slats so as to force the heads of the said two slats apart and sideways into the ground.

6. A method as claimed in claim 5 wherein the outer edges of the heads of the outer slats of adjacent holes of each frame are substantially contiguous.

7. A method as claimed in claim 6 wherein openings are provided at the said contiguous outer edges of the heads of adjacent outer slats.

8. A support for a tunnel comprising at least three frames spaced apart along the length of the tunnel, each frame defining the approximate cross-sectional area of the tunnel (or part thereof) and being provided with a first and a second row of holes, the holes in both rows extending through the frame in the direction of the tunnel and the first row being spaced inwardly of the second row, and a plurality of elongated members, each member extending in the direction of the tunnel through a hole in the first row of a first frame, through a hole in the second row of a second frame and outside a third frame, the said elongated members defining the walls of the tunnel between the frames, wherein the improvement comprises the use of a proportion of elongated members having the proportions of their lengths lying beyond the second frame and outside the third frame of greater width than the remainder of their lengths and such that the total widths of the portions of all of the elongated members lying beyond the second frame and outside the third frame is greater than the total widths of all of the holes in the second row of holes of the second frame through which the elongated members extend.

References Cited

UNITED STATES PATENTS 1,255,207 2/1918 Morgan _____ 61—45
3,280,572 10/1966 Hatton _____ 61—85

JACOB SHAPIRO, *Primary Examiner.*